US007353300B2

(12) United States Patent
Schumacher

(10) Patent No.: US 7,353,300 B2
(45) Date of Patent: Apr. 1, 2008

(54) APPARATUS TO IMPROVE THE FIRMWARE EFFICIENCY FOR A MULTIFRAME SERIAL INTERFACE

(75) Inventor: Frederic Schumacher, Aix-en-Provence (FR)

(73) Assignee: Atmel Corporation, San Jose, CA (US)

( * ) Notice: Subject to any disclaimer, the term of this patent is extended or adjusted under 35 U.S.C. 154(b) by 209 days.

(21) Appl. No.: 11/407,447

(22) Filed: Apr. 19, 2006

(65) Prior Publication Data

US 2007/0168580 A1 Jul. 19, 2007

(30) Foreign Application Priority Data

Jan. 18, 2006 (FR) .................. 06 00455

(51) Int. Cl.
*G06F 3/00* (2006.01)
*G06F 13/00* (2006.01)
(52) U.S. Cl. .................. 710/30; 370/470; 709/250
(58) Field of Classification Search ............ 710/29–34, 710/105–106; 375/219–222; 370/464–470; 709/250
See application file for complete search history.

(56) References Cited

U.S. PATENT DOCUMENTS

| 4,799,219 | A | * | 1/1989 | Calvignac et al. | .......... 370/433 |
| 5,436,937 | A | * | 7/1995 | Brown et al. | ............... 375/376 |
| 5,668,840 | A | * | 9/1997 | Takano | ....................... 375/368 |
| 5,717,870 | A | | 2/1998 | Dobson | ....................... 395/250 |
| 6,012,115 | A | | 1/2000 | Chambers et al. | ........... 710/105 |
| 6,118,393 | A | * | 9/2000 | Chiba et al. | .................. 341/61 |
| 7,099,246 | B2 | * | 8/2006 | Hayashi et al. | ........... 369/47.33 |
| 2002/0101803 | A1 | * | 8/2002 | Hayashi et al. | ............ 369/47.3 |

FOREIGN PATENT DOCUMENTS

EP 1480370 A1 * 11/2004

OTHER PUBLICATIONS

Ruff, Matt: "LIN Drivers for SLIC Module on the MC68HC908QL4", Application Note AN2633/D, Mar. 2004, pp. 1-36, XP-002402823, Freescale Semiconductor, Inc.
Ruff, Matthew: "Evolution of Local Interconnect Network (LIN) Solutions", Vehicular Technology Conference, 2003 IEEE 58th, Orlando, FL, Oct. 6-9, 2003, Piscataway, NJ, pp. 3382-3389, XP010702546.

(Continued)

*Primary Examiner*—Christpher Shin
(74) *Attorney, Agent, or Firm*—Schneck & Schneck; Thomas Schneck

(57) ABSTRACT

A serial network controller contains control logic to analyze and determine a duration of a proper frame time slot. A number of data fields in a transmission is ascertained from an identifier field supplied in a header field. The number of data fields plus a margin for data framing overhead is calculated to determine the frame time slot duration. A timer is programmed with the calculated frame time slot duration. The timer is clocked at each bit period of the transmission until the calculated duration of the frame time slot is reached. At the frame time slot value, a transmit ready flag is unmasked, allowing termination of the frame with a proper margin. By managing frame time slot calculation, timer operations, and interrupt handling, the control logic relieves a microprocessor core and other system resources from network timing details. The control logic frees system resources for other applications.

21 Claims, 9 Drawing Sheets

OTHER PUBLICATIONS

Specks, J. Will: "LIN—Protocol, Development Tools, and Software Interfaces for Local Interconnect Networks in Vehicles", 9th International Conference on Electronic Systems for Vehicles, Baden-Baden, Oct. 5, 2000, pp. 1-24, XP002287370.

* cited by examiner

Fig._3 (Prior Art)

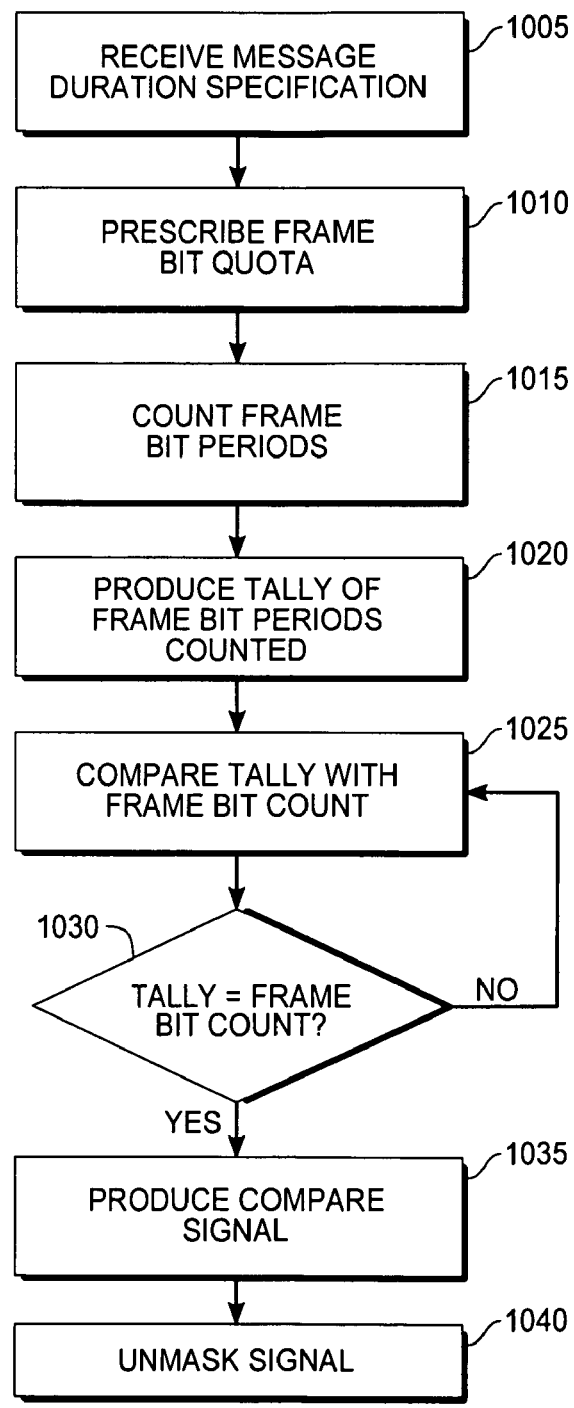
Fig._10

APPARATUS TO IMPROVE THE FIRMWARE EFFICIENCY FOR A MULTIFRAME SERIAL INTERFACE

TECHNICAL FIELD

The present invention relates to serial network interface devices. More particularly, the invention relates to a device for managing a maximum multiframe time allowance in a communication protocol.

BACKGROUND ART

Embedded electronic control systems incorporate serial communications between a controller, subsystem components, peripherals, and other controllers. Serial communication systems may be inexpensive, function reliably, and ease introduction of new technologies when used within an environment incorporating appropriate standards. A protocol, known as a local interconnect network (LIN) bus is one example of a serial communications standard meeting the requirements of an electronic control system.

With reference to FIG. 1, a prior art microcontroller architecture 100 incorporates a LIN controller 109. A microprocessor core 190 is connected by an address bus 110 and a read/write select line (R/W) 113 to an on-chip memory 105, a timer 106, an external bus interface (EBI) 103, and a universal asynchronous receiver/transmitter (UART) 107. The address bus 110 also connects to an address decoder 101. A write bus 111 connects from an output of the microprocessor core 190 to the on-chip memory 105, the timer 106, the EBI 103, and the UART 107. A read bus 112 connects from an output of a data mux 104 to an input of the microprocessor core 190. An on-chip memory read bus 121 connects from the on-chip memory 105, a timer read bus 122 connects from the timer 106, an external interface read bus 120 connects from the EBI 103, and a UART read bus 123 connects from the UART 107 each connect to a separate input of the data mux 104.

The address decoder 101 produces at most one of four different select signals on one of four respective select lines. The four select lines are an on-chip memory select line 131 connecting to the on-chip memory 105, a timer select line 132 connecting to the timer 106, an external bus interface select line 130 connecting to the EBI 103, and a UART select line 133 connecting to the UART 107. Each of the four select lines also connects to the data mux 104. An interrupt controller 102 connects to a timer interrupt line 142 from the timer 106 and to a UART interrupt line 143 coming from the UART 107. The interrupt controller 102 connects to the microprocessor core 190 through a processor interrupt line 140. At the UART 107, a transmit data line TXD and a receive data line RXD connect to and from a LIN transceiver 108 respectively. A bidirectional serial LIN bus 181 connects to the LIN transceiver 108.

With reference to FIG. 2, a UART frame 200 commences with a start bit transitioning from a high logic level (VDD) to a low logic level (GND). The start bit is followed by eight data bits B0-B7 and a stop bit. Each one of the UART frame bits is one bit period (a $T_{bit}$) long.

With reference to FIG. 3 a prior art LIN controller 109 (FIG. 1) connects through a bidirectional microcontroller peripheral bus 350 to the microprocessor core 190 (FIG. 1). A clock line 353 connects to a LIN user interface 304, a LIN transmitter 301, a LIN receiver 303, and a baud rate generator 302. The LIN user interface 304 contains an identifier register (IDR) 306, a transmit hold register (THR) 308, a mode register (MODE) 310, a control register (CTRL) 312, a receive hold register (RHR) 316, and a status register 314 containing two synchronization flags. The synchronization flag signals in the status register 314 are a transmit ready flag TXRDY and a receive ready flag RXRDY.

The LIN transmitter 301 contains a 3-to-1 multiplexer 321 that connects to the identifier register 306, the transmit hold register 308, and a checksum generator 323. An output of the 3-to-1 multiplexer 321 connects to the checksum generator 323 and a transmit shift register 325. The transmit shift register 325 connects to the transmit data line TXD (FIG. 1). A transmit FSM (finite state machine) 327 connects to the identifier register 306, the checksum generator 323, the transmit shift register 325, the transmit ready flag TXRDY in the status register 314, the mode register 310, the control register 312, and the baud rate generator 302.

The LIN receiver 303 contains a receive shift register 335 connected to the receive data line RXD (FIG. 1), the receive hold register 316, and a checksum check block 333. A receive FSM (finite state machine) 337 connects to the checksum check block 333, the receive shift register 335, the receive ready flag RXRDY, the mode register 310, the control register 312, and the baud rate generator 302.

A LIN controller 109 (FIG. 1) may be configured as a master or as a slave. On a LIN bus, several LIN controllers 109 may be connected but only one may be acting as a master while all others controllers are connected as slaves. The master initiates communication by sending a header. In response to the header a master or one of the slaves sends a response.

With reference to FIG. 4, a LIN frame 405 is composed of multiple UART frames 200 and is classified as a UART multiframe. The LIN frame 405 is made up of a header 410 and a response 415, each of which is a UART multiframe. The header 410 is composed of a break field 420, a sync field 425, and an identifier field 430. The break field 420 is defined by the bus signal transitioning from high to low and maintaining a logic low level for a minimum duration of 13 $T_{bits}$ long. The sync field 425 is a specific pattern (the data value 0×55), which causes regular toggling of the serial bus and is used to synchronize the slaves baud rate compared to the master. Sending of the sync field 425 sets an example of a typical expected time between two rising edges of any transmission. A break field 420 begins any LIN frame 405. The identifier field 430 contains a message identifier (not shown) incorporating information about the transmitter, the receiver(s), the purpose of the LIN frame 405, and a data field length (not shown). The response 415 is composed of 1 to N data fields 444a, . . . , 444g, 444h followed by a checksum field 450. The data field length (N) may typically be 1, 2, 4, or 8 data fields long.

With reference to FIG. 5, the LIN controller 109 (FIG. 1), configured as a master, sends the header 410 and sends the response 415 of the LIN frame 405. The microprocessor core 190 signals commencement of loading the identifier field 430 into the identifier register 306 by initiating a WRITE_IDENTIFIER_REGISTER command 515. The header 410 is initiated for transmission by sending the break field 420 and the synch field 425. The identifier field 430 contains information identifying transmission of the response field 415. The Receipt of the WRITE_IDENTIFIER_REGISTER command 515 triggers the transmit FSM 327 (FIG. 3) to lower the transmit ready flag TXRDY 555, select the identifier register 306 with the 3-to-1 multiplexer 321, and shift the identifier field 430 to the transmit shift register 325. As the LIN controller 109 sends the response 415, a raised transmit ready flag 540*a* is produced as the identifier field 430 starts transmission over the transmit data line TXD.

The transmit ready flag TXRDY rising signals the microprocessor core 190 that a next field may be written to the transmit hold register 308. The microprocessor core 190 places a first data field 444*a* in the transmit hold register 308 and initiates a first WRITE_THR command 565*a*. The first WRITE_THR command 565*a* causes the transmit FSM 327 to select the transmit hold register 308 with the 3-to-1 multiplexer 321 and write the first data field 444*a* to the transmit shift register 325. The transmit ready flag TXRDY lowers 545*a* at commencement of the first WRITE_THR command 565*a* corresponding to the first data field 444*a*.

A second raised transmit ready flag 540*b* occurs when the first data field 444*a* has been written to the transmit shift register 325 and is ready for transmission over the transmit data line TXD to the LIN transceiver 108 (FIG. 1). Corresponding sequences of raised transmit ready flags 540*a*, 540*b*, . . . , 540*g*, 540*h*; WRITE_THR commands 565*a*, 565*b*, . . . , 565*g*, 565*h*; lowered transmit ready flags 545*a*, 545*b*, . . . , 545*g*, 545*h*; and sent data fields 444*a*, . . . , 444*g*, 444*h* occur as explained (in the singular), supra, until an entire response 415 is transmitted. The identifier field 430 contains information to indicate to the transmit FSM 327 how many data fields there are to send.

After the last data field 444*h* is sent, the transmit FSM 327 enters a generate_checksum state (not shown) causing selection of the checksum generator 323 by the 3-to-1 multiplexer 321 and writing of a checksum field 450 to the transmit shift register 325. The checksum generator 323 maintains a checksum during transmission of the sequence of data fields 444*a*, . . . , 444*g*, 444*h*. After the checksum field 450 is transmitted, the transmit ready flag TXRDY is raised 559 by the transmit FSM 327 signifying the end of the LIN frame 405.

With reference to FIG. 6, the LIN controller 109 (FIG. 1), configured as a master, sends the header 410 and receives the response 415 of the LIN frame 405. The microprocessor core 190 signals commencement of loading the identifier field 430 into the identifier register 306 by initiating a WRITE_IDENTIFIER_REGISTER command 515. The header 410 is initiated for transmission by sending the break field 420*a* and the synch field 425. The identifier field 430 contains information identifying characteristics of the response field 415. The Receipt of the WRITE_IDENTIFIER_REGISTER command 515 triggers the transmit FSM 327 (FIG. 3) to lower the transmit ready flag TXRDY 555*a*, select the identifier register 306 with the 3-to-1 multiplexer 321, and shift the identifier field 430 to the transmit shift register 325. In the case of the LIN controller 109 receiving the response 415, the transmit ready flag TXRDY remains at a low logic level until the end of the LIN frame 405.

Another LIN controller 109 (FIG. 1), configured as a slave, responds to the header 410 by sending a first data field 444*a* over the LIN bus, through the LIN transceiver 108 of the LIN controller 109 configured as a master, and over the receive data line RXD. After the first data field 444*a* is completely read into the receive shift register 335 (FIG. 3) and transferred into the receive hold register 316, the receive FSM 337 causes a raised receive ready flag 640*a*. The high logic level of the receive ready flag RXRDY signals the microprocessor core 190 that the first data field 444*a* is ready for reading. The microprocessor core 190 issues a first READ_RHR command 656*a* that transfers the first data field 444*a* and causes the receive FSM 337 to lower the receive ready flag 645*a*.

The receive shift register 335 of the LIN (master) controller 109 (FIG. 1) receives a sequence of data fields 444*a*, . . . , 444*g*, 444*h* from the targeted (slave) LIN controller 109. Correspondingly, a sequence of data fields 444*a*, . . . , 444*g*, 444*h*; a sequence of raised receive ready flags 640*a*, . . . , 640*f*, 640*g*, 640*h*; a sequence of READ_RHR commands 656*a*, . . . , 656*f*, 656*g*, 656*h*; and a sequence of lowered receive ready flags 645*a*, . . . , 645*f*, 645*g*, 645*h* occur as explained (in the singular) supra, until an entire response 415 is received.

After the last data field 444*h* is received, the receive FSM 337 of the (master) LIN controller 109 (FIG. 1) enters a check_checksum state (not shown) causing receipt of the last field as a checksum field 450. The checksum check block 333 maintains a checksum during receipt of the sequence of data fields 444*a*, . . . , 444*g*, 444*h*. Comparison of the maintained checksum with the checksum field 450 is made. On a comparison indicating equal values for the maintained checksum and the checksum field 450, a raised transmit ready flag 559 signifies the end of the LIN frame 405. On a non-equal comparison of checksums, a transmission error is forwarded to the microprocessor core 190.

The microprocessor core 190 is directly involved in details regarding determination of a minimum LIN frame time slot (not shown) and programming of the timer 106. The microprocessor core 190 has significant overhead in servicing and resetting of interrupts from the timer 106, the UART 107, the LIN controller 109 (FIG. 1), and the remainder of the embedded electronic control system. The resources of the system involved in timing and managing minimum LIN frame time slot details are not available to manage other applications the system is called on to handle. In addition, interrupts from the remainder of the system may vie for handling by service routines executed by the microprocessor core 190. The additional interrupt servicing keeps the microprocessor core 190 from properly managing all of the interrupts concurrently with other system resource requirements within the time limits of the minimum LIN frame time slot. Failure of the microprocessor core 190 to properly manage interrupts and system resources during a minimum LIN frame time slot, means the LIN controller 109 operating as the master is out of compliance with the LIN protocol and system communications are erroneous.

It would be desirable to determine the duration of a minimum LIN frame time slot, timer operations, and appropriate interrupts in compliance with the LIN protocol and not require direct involvement of the microprocessor core 190 and general system resources in providing timing details for minimum LIN frame time slot. It is desirable for the appropriate protocol management to be done by an interface device, which offloads the microprocessor core 190 from the minutia of the commands, interrupts, and certain service routines that comprise a monopolizing overhead of system resources.

SUMMARY

A serial network controller contains additional control logic to analyze and determine a duration of a proper minimum LIN frame time slot. A number of data fields in a transmission is ascertained from an identifier field supplied in a header field. The number of data fields plus a margin for data framing overhead is calculated to determine the minimum LIN frame time slot. A timer is programmed with the calculated minimum LIN frame time slot. The timer is clocked at each bit period of the transmission until the calculated duration of the minimum LIN frame time slot is reached. At the minimum LIN frame time slot value, a transmit ready flag TXRDY is unmasked, allowing termination of the frame with a proper margin. By managing calculation of the minimum LIN frame time slot, timer operations, and interrupt handling, the additional logic relieves a microprocessor core and other system resources from network timing details. The additional control logic frees system resources for other applications.

BRIEF DESCRIPTION OF DRAWINGS

FIG. 10 for is a flow diagram of an exemplary process for managing serial network interfaces corresponding to FIG. 7.

DETAILED DESCRIPTION

Figure 1:
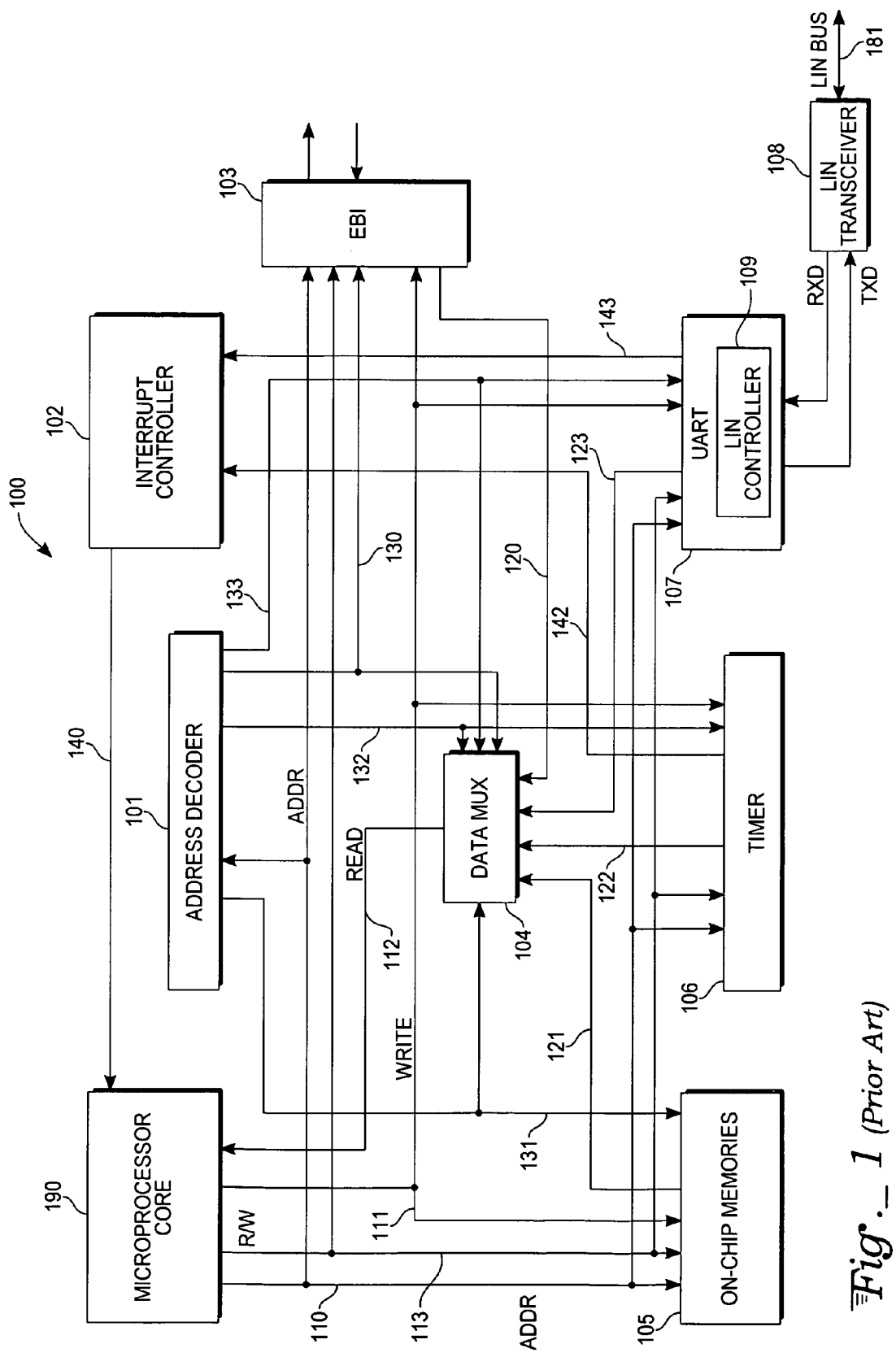
FIG. 1 is a system-level diagram of a prior art microcontroller architecture incorporating a LIN controller.
Figure 2:
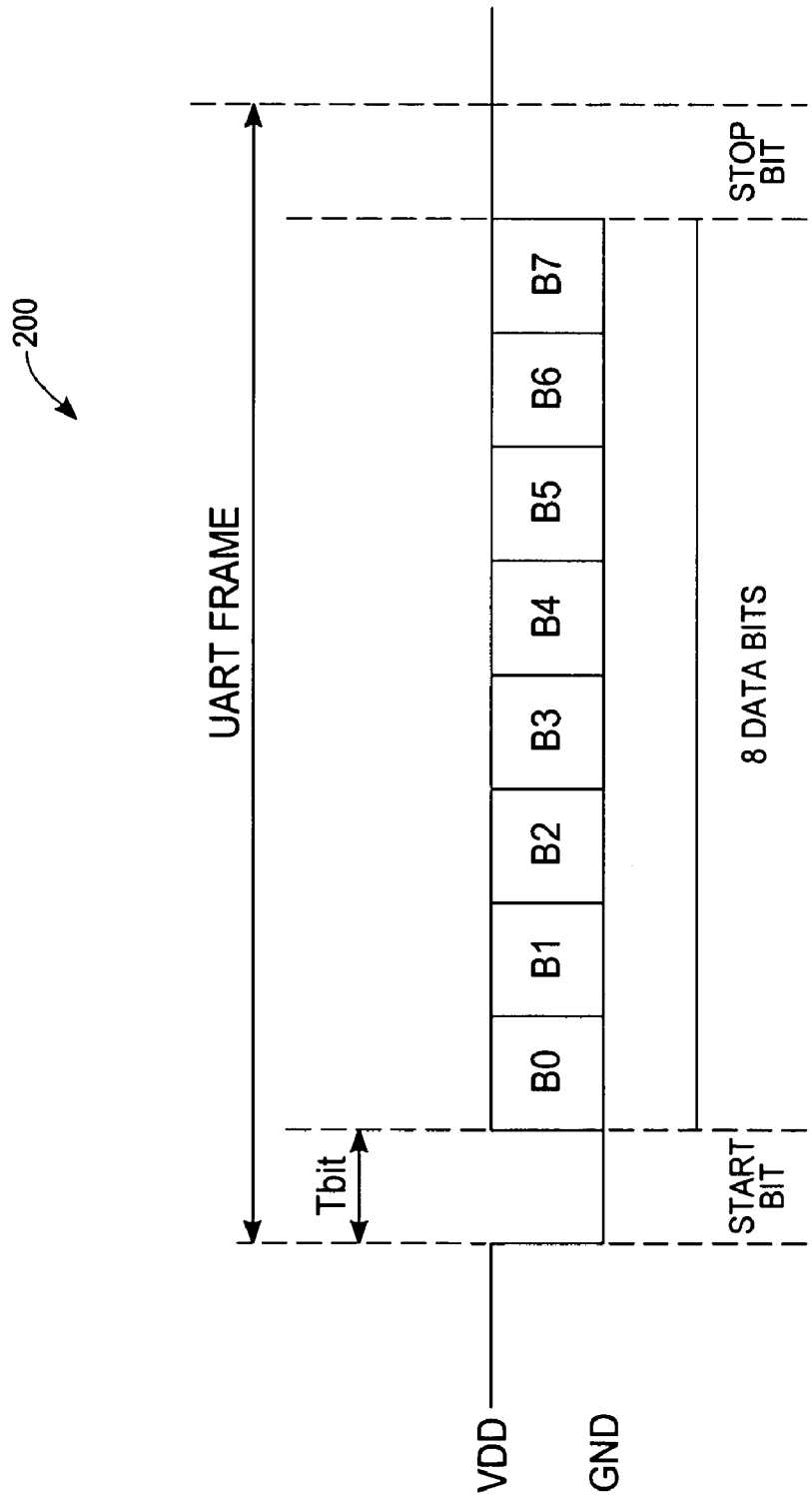
FIG. 2 is a prior art generic UART frame.
Figure 3:
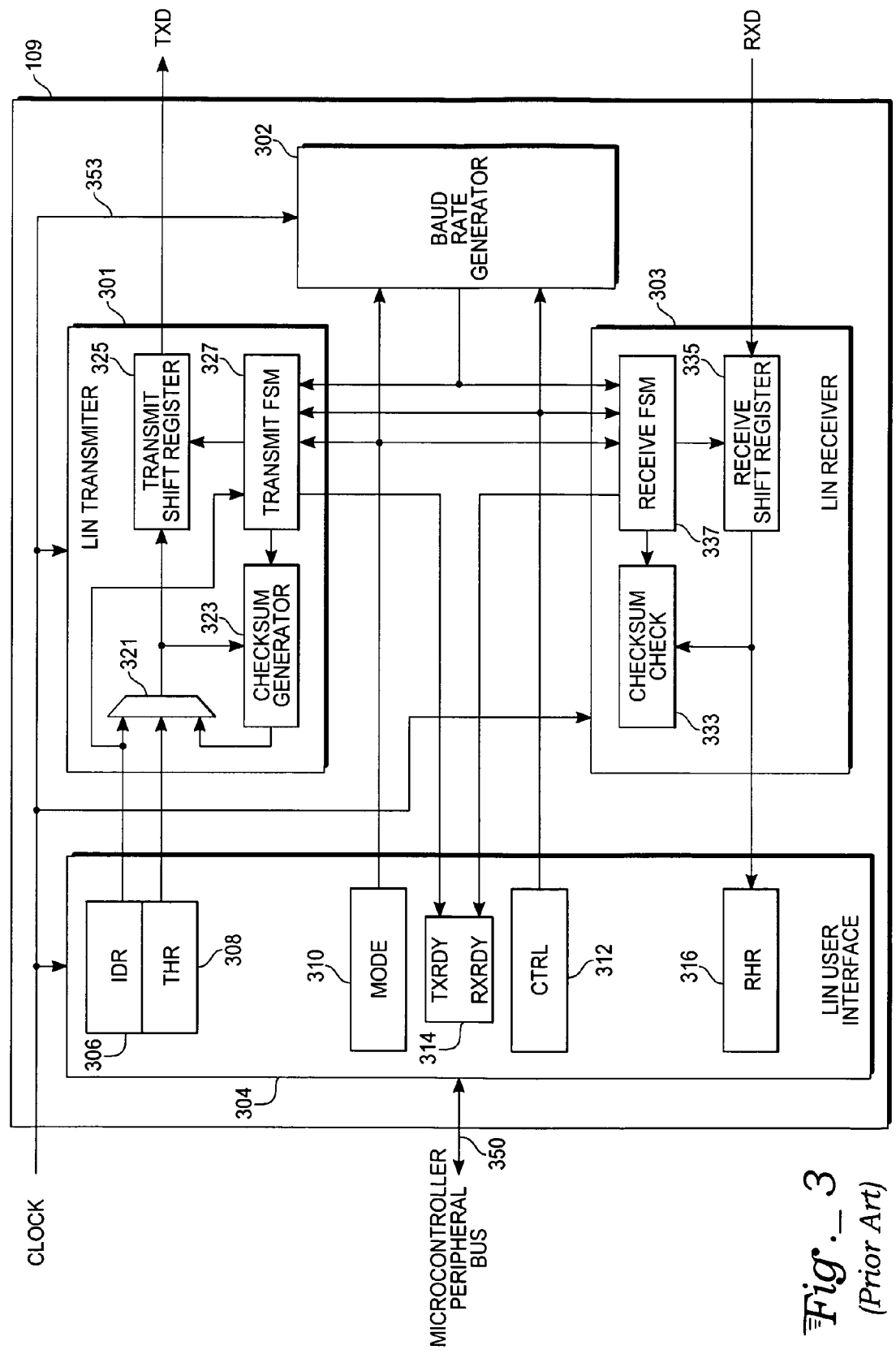
FIG. 3 is a block diagram of a prior art LIN controller.
Figure 4:
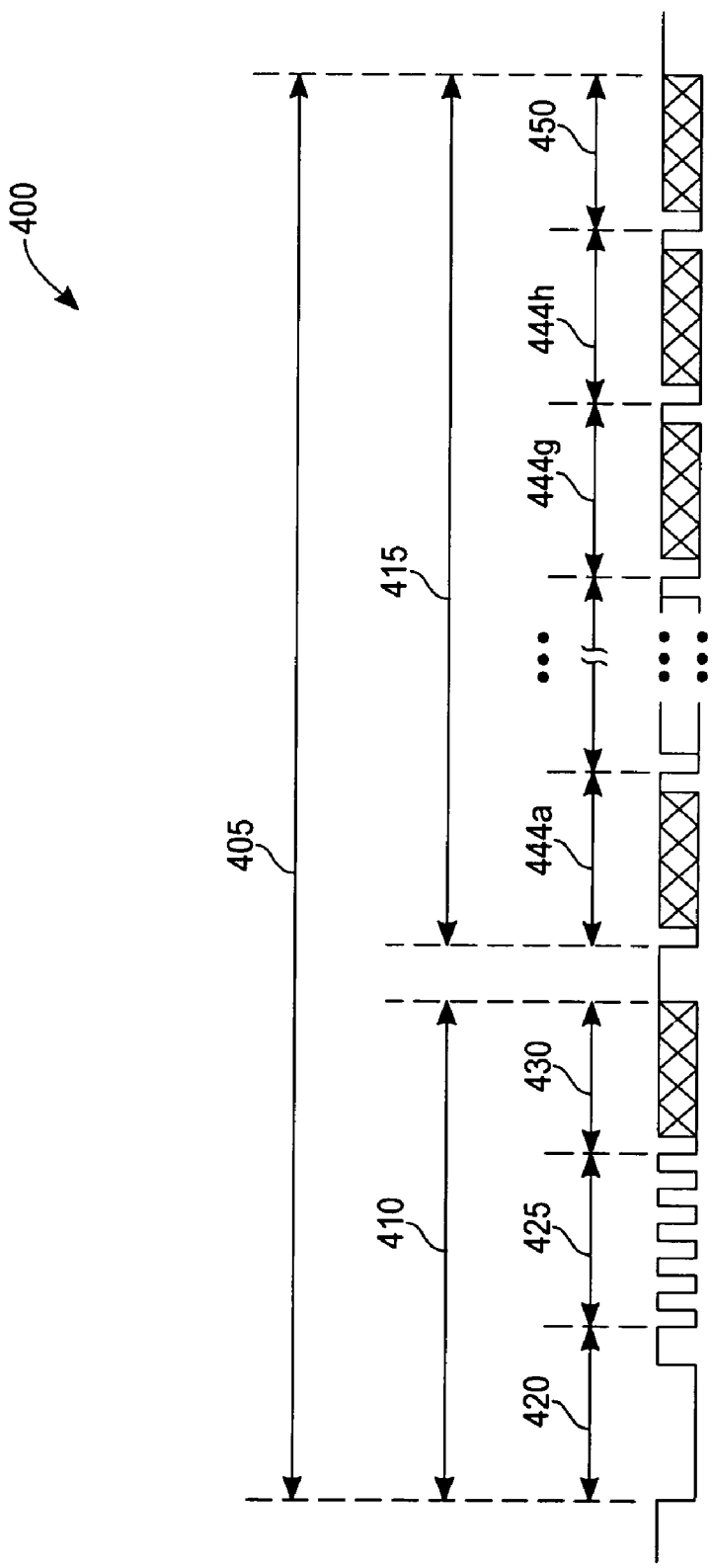
FIG. 4 is a waveform diagram of a prior art generated generic LIN frame in perspective as a UART multiframe.
Figure 7:
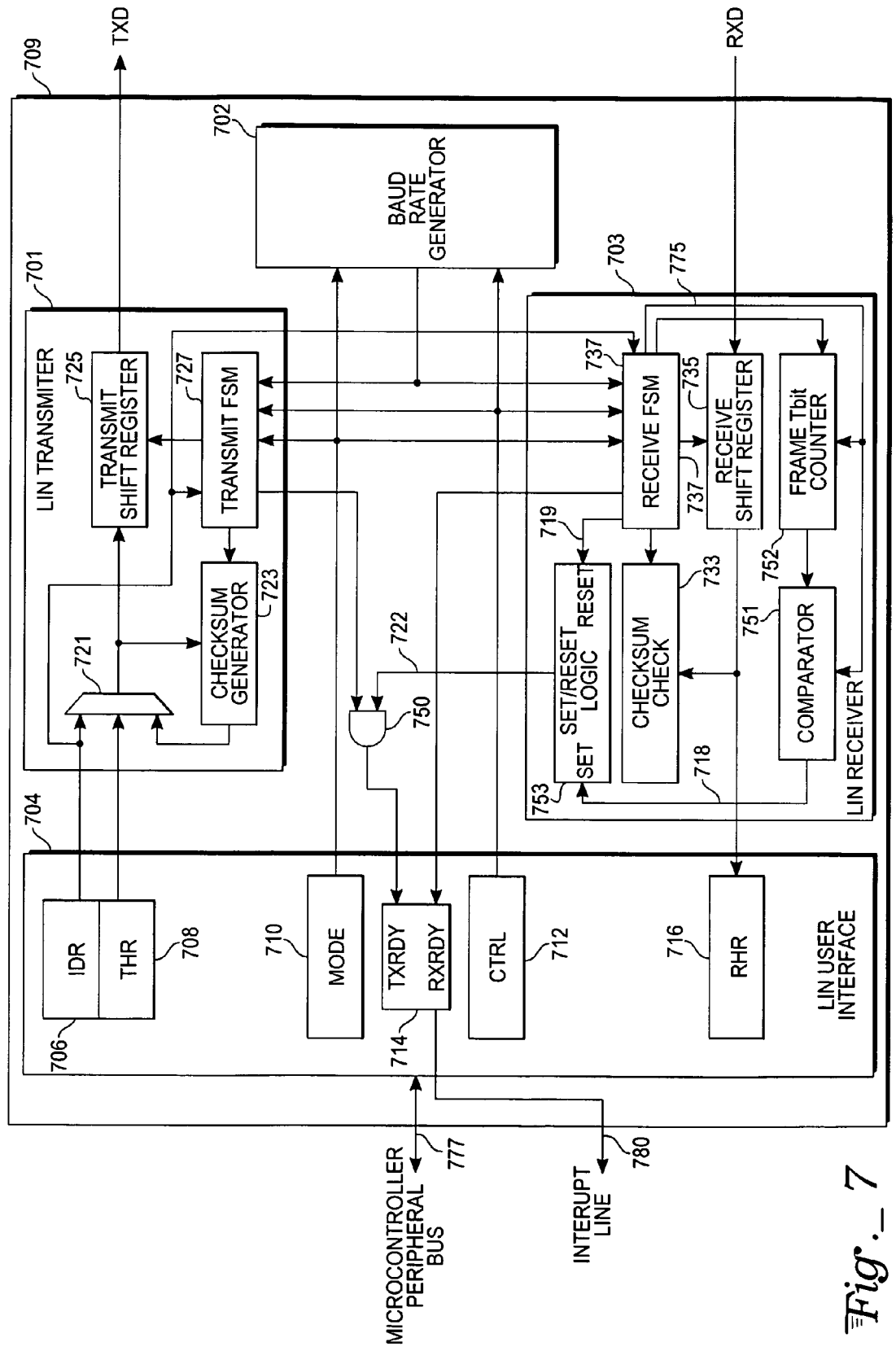
FIG. 7 is a block diagram of an exemplary LIN controller with hardware for compare and frame bit counter functions.

With reference to FIG. 7, an exemplary LIN controller 709 connects through a bidirectional microcontroller peripheral bus 777 to the microprocessor core 190 (FIG. 1). The exemplary LIN controller 709 contains an exemplary LIN receiver 703 having a frame $T_{bit}$ counter 752, a comparator 751, and a set/reset logic block 753. A receive FSM 737 connects with an output of an identifier register 706 and with a FSM control line 775 to the comparator 751 and the frame $T_{bit}$ counter 752 to communicate a reset signal (not shown) or a maximum number of $T_{bit}$ values for a frame. The frame $T_{bit}$ counter 752 connects to the comparator 751 to communicate a $T_{bit}$ count. The comparator 751 connects through a comparator output line 718 to the set/reset logic block 753. The receive FSM 737 connects through an FSM rest line 719 to a reset input pin of the set/reset logic block 753. The set/reset logic block 753 connects through an unmask control line 722 to an input of a mask gate 750. The transmit FSM 727 connects to an input of the mask gate 750 to communicate the transmit ready flag TXRDY. An output of the mask gate 750 connects to a transmit/receive logic block 714. An interrupt line 780 connects from an output of the transmit/receive logic block 714 to the microprocessor core 190.

The LIN receiver 703 contains a receive shift register 735 connected to the receive data line RXD, the receive hold register 716, and a checksum check block 733. The receive FSM (finite state machine) 737 connects to the checksum check block 733, the receive shift register 735, the receive ready flag RXRDY, the mode register 710, the control register 712, and the baud rate generator 702.

The exemplary LIN receiver 703 connects to a LIN user interface 704, a LIN transmitter 701, and a baud rate generator 702. The LIN user interface 704 contains the identifier register (IDR) 706, a transmit hold register (THR) 708, a mode register (MODE) 710, a control register (CTRL) 712, a receive hold register (RHR) 716, and a status register 714 containing two synchronization flags. The synchronization flag signals in the status register 714 are a transmit ready flag TXRDY and a receive ready flag RXRDY.

The LIN transmitter 701 contains a 3-to-1 multiplexer 721 that connects to the identifier register 706, the transmit hold register 708, and a checksum generator 723. An output of the 3-to-1 multiplexer 721 connects to the checksum generator 723 and a transmit shift register 725. The transmit shift register 725 connects to the transmit data line TXD. A transmit FSM (finite state machine) 727 connects to the identifier register 706, the checksum generator 723, the transmit shift register 725, the transmit ready flag TXRDY in the status register 714, the mode register 710, the control register 712, and the baud rate generator 702.

Figure 5:
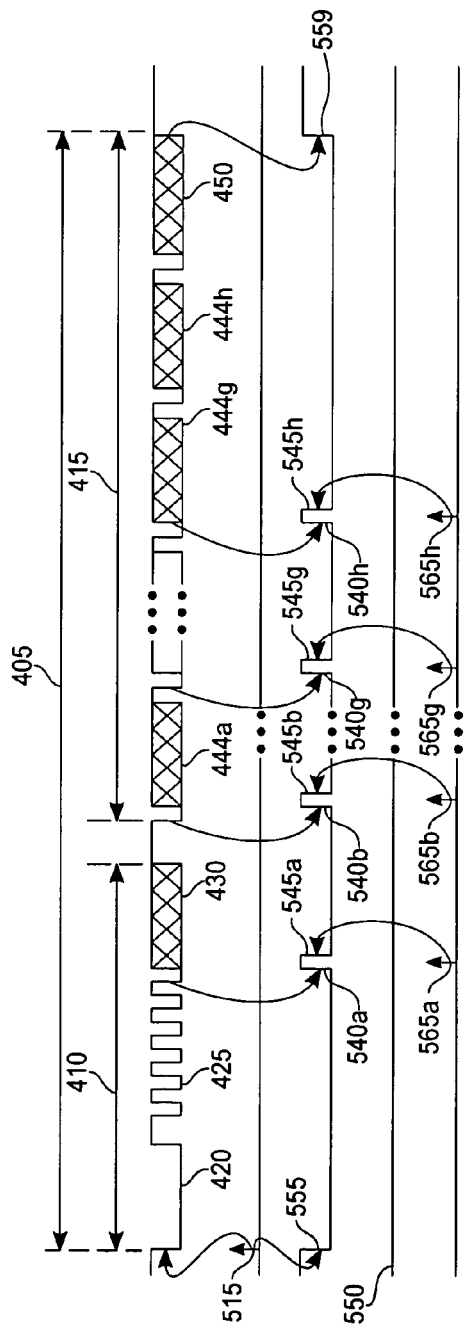
FIG. 5 is a waveform diagram of a prior art LIN master controller sending a header and a response.
Figure 8:
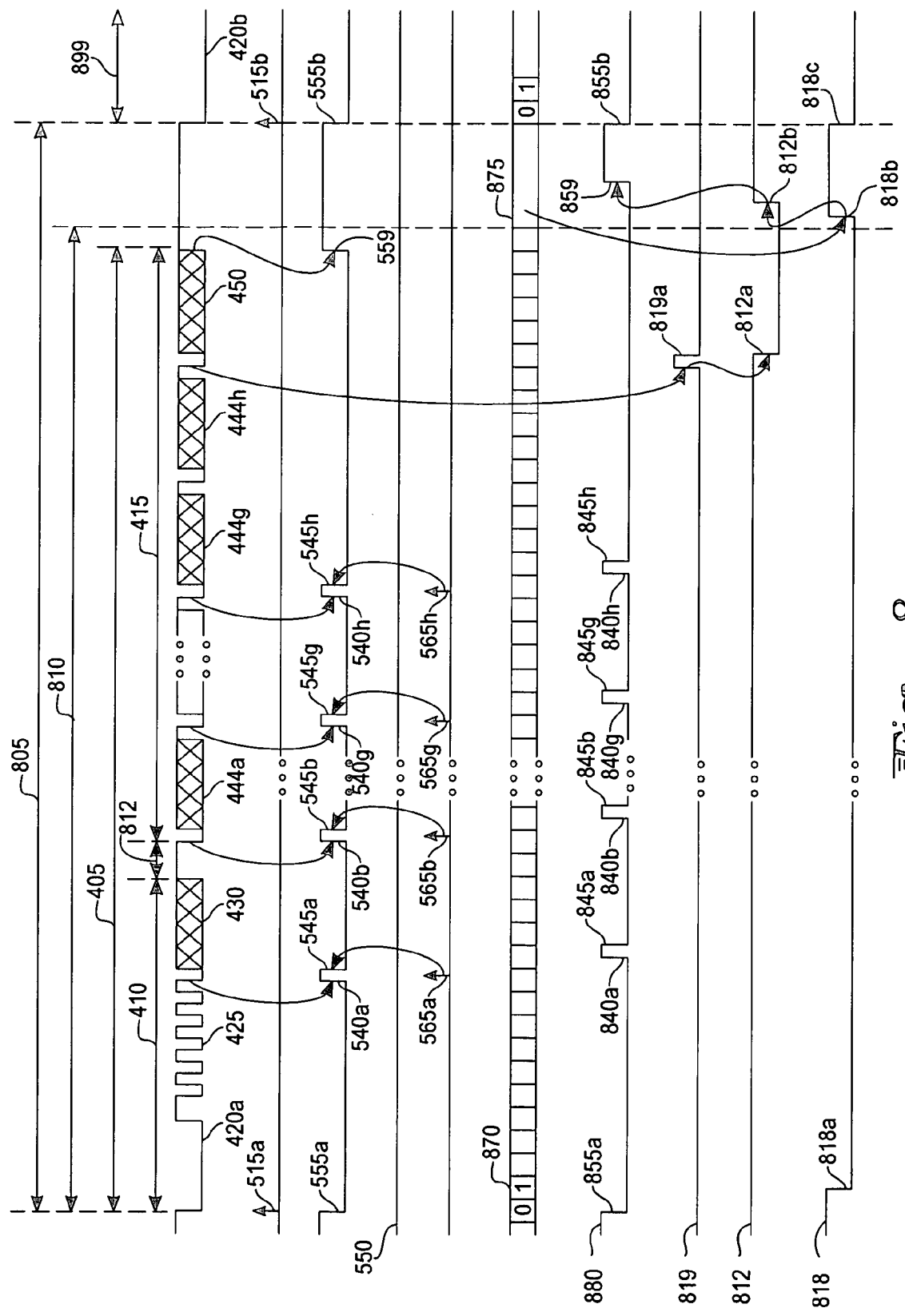
FIG. 8 is a waveform diagram corresponding to FIG. 7 of exemplary hardware operations for determining a LIN frame while sending a response.

With reference to FIG. 8 and with continuing reference to FIG. 7, the exemplary LIN controller 709 configured as master sends the LIN frame 405 using exemplary logic, explained infra, to produce a minimum LIN frame time slot 805. The first WRITE_IDENTIFIER_REGISTER command 515*a*; the sequences of WRITE_THR commands 565*a*, 565*b*, . . . , 565*g*, 565*h*; and toggling of the transmit ready flag TXRDY occur as explained supra (FIG. 5) for a LIN master 709 to send the header 410 and send the response 415.

A minimum LIN frame time slot 805 allows for (is equal to or greater than) a maximum LIN frame time 810. The maximum LIN frame time 810 is calculated from the nominal times for the header 410 and the response 415 (including data length dependencies) plus an allocation for an overhead of time between elements of the LIN frame 405. The overhead time between elements is composed of an in-frame response time 812 (i.e., a time between the header 410 and the response 415), an inter-byte time (i.e., a time between data fields—not shown), and an inter-frame time (i.e., a time between the LIN frames 405—not shown). A 40% allocation for the overhead time is added to a duration of frame elements. Therefore, the minimum LIN frame time slot 805 is equal to or greater than the maximum LIN frame time 810.

A timeout signal 818 is communicated by the connection from the comparator 751 to the set/reset logic block 753. A $\overline{\text{MASK}}$ signal 812 is communicated by the connection from the set/reset logic block 753 to the mask gate 750. A $\overline{\text{MASK}}$ reset signal 819 is communicated by the connection from the transmit FSM 737 to the set/reset logic block 753. Prior to initiation of the LIN frame 405, the timeout signal 818 and the $\overline{\text{MASK}}$ signal 812 are at a high logic level and the $\overline{\text{MASK}}$ reset signal 819 is at a low logic level.

To begin the LIN frame 405, a software application writes the identifier field 430 into the identifier register 706. Writing of the identifier register 706 initiates transmission of the header 410 by the transmit FSM 727. Based on information in the identifier field 430, a command is sent to the receive FSM 737 with information to determine the number of data fields in the transmission. From the identifier field 430 and a baud rate selection (not shown), the receive FSM 737 determines the maximum LIN frame time 810. A number of $T_{bits}$ corresponding to the maximum LIN frame time 810 is an alarm time 875 determined by the receive FSM 737. The alarm time 875 is programmed into the comparator 751 by the receive FSM 737.

The receive FSM 737 sends a reset signal (not shown) to the frame $T_{bit}$ counter 752. During a period equal to one $T_{bit}$, the frame $T_{bit}$ counter 752 is cleared by the reset signal. The reset signal from the receive FSM 737 also resets the comparator 751. Resetting the comparator 751 produces a low timeout signal 818a. The receive FSM 737 starts 870 the frame $T_{bit}$ counter 752. After the sync field 425 is transmitted, the transmit FSM 727 sends the transmit ready flag TXRDY as explained supra.

The mask gate 750 receives the transmit ready flag TXRDY at one input. The $\overline{MASK}$ signal 812 is at a high logic level on the other input of the mask gate 750. The high logic level of the $\overline{MASK}$ signal 812 on the input of the mask gate 750 allows any transition of the transmit ready signal TXRDY to be propagated to the transmit/receive logic block 714. The transmit/receive logic block 714 allows the transmit ready signal TXRDY to be propagated as an interrupt signal 880 when a high level $\overline{MASK}$ signal 812 is present. With a high $\overline{MASK}$ signal 812 the sequences of raised transmit ready flags 540a, 540b, . . . , 540g, 540h and lowered transmit ready flags 545a, 545b, . . . , 545g, 545h are propagated to the transmit/receive logic block 714 producing an output of sequences of raised interrupt signals 840a, 840b, . . . , 840g, 840h and lowered interrupt signals 845a, 845b, . . . , 845g, 845h to the microprocessor core 190. The microprocessor core 190 receives the sequence of raised interrupt signals 840a, 840b, . . . , 840g, 840h and lowered interrupt signals 845a, 845b, . . . , 845g, 845h which triggers the software application to initiate the sequence of WRITE_THR commands 565a, 565b, . . . , 565g, 565h.

As the checksum field 450 of the response 415 is started, a pulse of the $\overline{MASK}$ reset signal 819a is initiated by the receive FSM 737. The pulse of the $\overline{MASK}$ reset signal 819a resets the $\overline{MASK}$ signal 812 to a low logic level 812a which masks the transmit ready flag TXRDY from being propagated as an interrupt to the microprocessor core 190. After transmission of the checksum field 450 is completed, the high transmit ready flag 559 is produced. The high transmit ready flag 559 is masked by the low logic level of the $\overline{MASK}$ signal 812 on the mask gate 750 after the reset of the $\overline{MASK}$ signal 812a.

After an amount of time equal to the maximum LIN frame time 810, the number of $T_{bits}$ counted by the frame $T_{bit}$ counter 752 equals the alarm time 875 programmed into the comparator 751. The comparator 751, on detecting an equivalence of $T_{bit}$ count and alarm time 875, sets a high timeout signal 818b. The high timeout signal 818b sets the set/reset logic block 753 and provides a high $\overline{MASK}$ signal 812b to the mask gate 750.

With a high $\overline{MASK}$ signal 812b, the high level transmit ready flag TXRDY is propagated to the transmit/receive logic block 714 and a high interrupt signal 859 is propagated on the interrupt line 780 (FIG. 7) to the microprocessor core 190. A next LIN frame 899 begins with a second WRITE_IDENTIFIER_REGISTER command 515b lowering the transmit ready flag 555b and resetting the interrupt signal 855b. Subsequently, the receive FSM 737 resets the timeout signal 818c and a remainder of the frame continues in a manner similar to the first LIN frame 405, explained supra.

Figure 6:
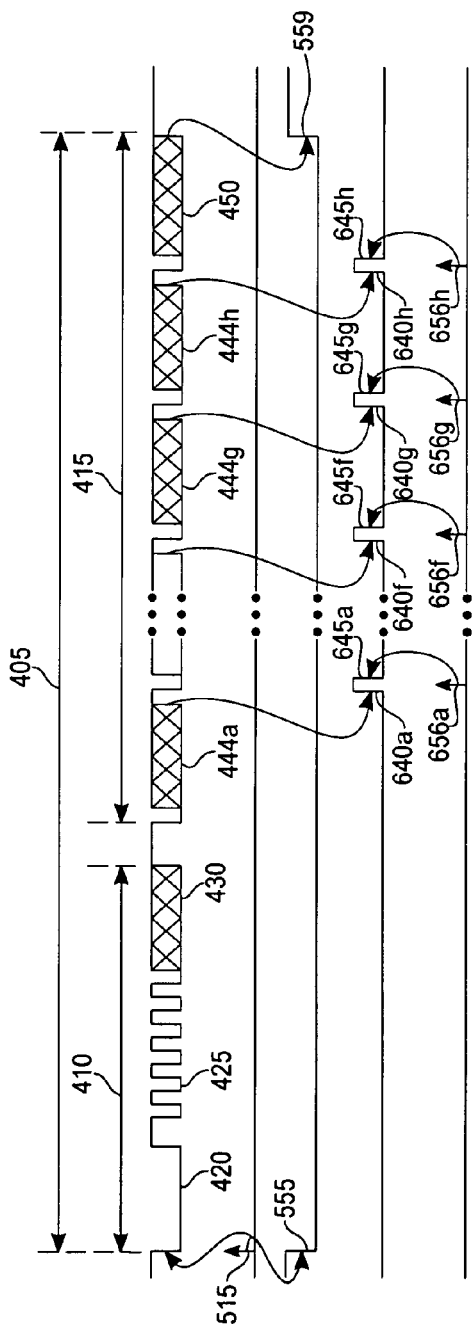
FIG. 6 is a waveform diagram of a prior art LIN master controller sending a header and receiving a response.
Figure 9:
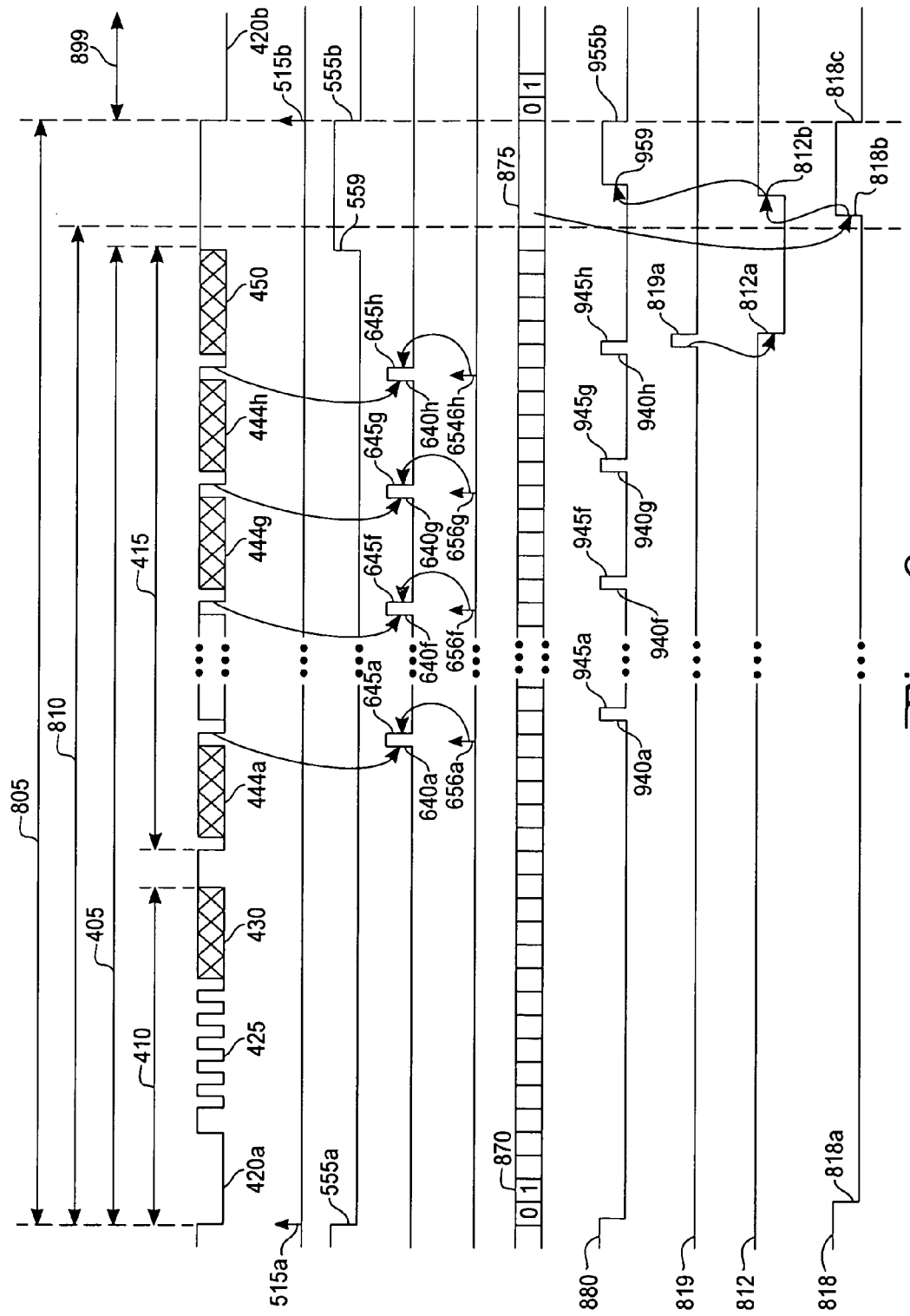
FIG. 9 is a waveform diagram corresponding to FIG. 7 of exemplary hardware operations for determining a LIN frame while receiving a response.

With reference to FIG. 9 and with continuing reference to FIGS. 7 and 8, an exemplary LIN master controller 709 sends the header 410 and receives the response 415 in the LIN frame 405 using exemplary logic, explained infra, to produce a minimum LIN frame time slot 805. The first WRITE_IDENTIFIER_REGISTER command 515a; the sequence of raised receive ready flags 640a, . . . , 640f, 640g, 640h; the sequence of READ_RHR commands 656a, . . . , 656f, 656g, 656h; and the sequence of lowered receive ready flags 645a, . . . , 645f, 645g, 645h all occur as explained supra (FIG. 6). The raising and lowering of the receive ready flags produce a corresponding sequence of raised and lowered transitions.

To begin the LIN frame 405, the software application writes the identifier field 430 into the identifier register 706. Writing of the identifier register 706 initiates transmission of the header 410 by the transmit FSM 727. The number of data fields in the transmission, the minimum LIN frame time slot 805, and the alarm time 875 are determined by the receive FSM 737 as explained supra. The alarm time 875 is programmed into the comparator 751 by the receive FSM 737. The receive FSM 737 sends a reset signal (not shown) to the frame $T_{bit}$ counter 752 and the comparator 751. The low timeout signal 818a and the start of the frame $T_{bit}$ counter 752 occur as explained supra.

The transmit/receive logic block 714 allows the receive ready signal RXRDY to be propagated as an interrupt signal 880. The sequences of raised receive ready flags 640a, . . . , 640f, 640g, 640h and lowered receive ready flags 645a, . . . , 645f, 645g, 645h are propagated to the transmit/receive logic block 714. The transmit/receive logic block 714 produces a sequences of raised interrupt signals 940a, . . . , 940f, 940g, 940h to the microprocessor core 190 which triggers the software application to initiate the sequence of READ_RHR commands 656a, . . . , 656f, 656g, 656h. The sequence of READ_RHR commands 656a, . . . , 656f, 656g, 656h from the microprocessor core 190 produces the sequence of lowered receive ready flags 645a, . . . , 645f, 645g, 645h in response. The sequence of lowered receive ready flags 645a, . . . , 645f, 645g, 645h produces the sequence of lowered interrupt signals 945a, . . . , 945f, 945g, 945h reflecting completion of the reception of the data fields 444a, . . . , 444g, 444h.

As the checksum field 450 of the response 415 is started, a pulse of the $\overline{MASK}$ reset signal 819a is initiated by the receive FSM 737. The pulse of the $\overline{MASK}$ reset signal 819a resets the $\overline{MASK}$ signal 812 to a low logic level 812a which masks the transmit ready flag TXRDY from being propagated as an interrupt to the microprocessor core 190. After transmission of the checksum field 450 is completed, the high transmit ready flag 559 is produced. The high transmit ready flag 559 is masked by the low logic level of the $\overline{MASK}$ signal 812 on the mask gate 750 after the reset of the $\overline{MASK}$ signal 812a.

After an amount of time equal to the maximum LIN frame time 810, the number of $T_{bits}$ counted by the frame $T_{bit}$ counter 752 equals the alarm time 875 programmed into the comparator 751. The comparator 751, on detecting an equivalence of $T_{bit}$ count and alarm time 875, sets a high timeout signal 818b. The high timeout signal 818b sets the set/reset logic block 753 and provides a high $\overline{MASK}$ signal 812b to the mask gate 750.

With a high $\overline{MASK}$ signal 812b the high level transmit ready flag TXRDY is propagated to the transmit/receive logic block 714 and a high interrupt signal 959 is propagated on the interrupt line 780 (FIG. 7) to the microprocessor core 190. A next LIN frame 899 begins with the second WRITE_IDENTIFIER_REGISTER command 515b lowering the transmit ready flag 555b and resetting the interrupt signal 955b. Subsequently, the receive FSM 737 resets the timeout signal 818c and the remainder of the frame continues in a manner similar to the first LIN frame 405, explained supra.

With reference to FIG. 10, an exemplary process for managing serial network interfaces commences with receiving 1005 a specification of a duration of a message in a network transmission followed by prescribing 1010 a frame bit quota equal to the message duration. The process continues with counting 1015 a plurality of frame bit periods in a message transmission and producing 1020 a tally of the plurality of frame bit periods counted. The process goes on with comparing 1025 the tally of frame bit periods with the frame bit quota followed by determining 1030 if the tally of frame bit periods is equal to the frame bit quota. If the tally of frame bit periods is not equal to the frame bit quota, the process returns to comparing 1025 the tally of frame bit periods with the frame bit quota. The process proceeds with producing 1035 a compare signal if the tally of the plurality of frame bit periods is equal to the frame bit quota and concludes with unmasking 1040 a signal if the compare signal is produced.

While various portions of a multiframe interface device have been depicted with exemplary components and configurations, an artisan in the communications field would readily recognize alternative embodiments for accomplishing a similar result. For instance, a mask gate has been represented as an AND gate with a $\overline{\text{MASK}}$ signal (active low) applied. An artisan in the field would recognize a possibility for various alternatives for implementing a gating function. For example, an artisan would recognize that a signal may be gated or masked (to a high level) by a high logic level applied to a NOR gate with a series inverter at an output. Alternatively a mask gate may be implemented by a low logic level applied to a NAND gate with a series inverter at an output.

Additionally, a set/reset function has been represented in exemplary fashion as a logic block with set and reset inputs. An artisan skilled in the field would recognize that a set/reset latch would perform an equivalent function. The specification and drawings are therefore to be regarded in an illustrative rather than a restrictive sense.

What is claimed is:

1. A multiframe bus management device comprising:
  a frame bit counter capable of counting a plurality of frame bit periods and producing a tally of the plurality of frame bit periods counted during a message length;
  a comparator coupled to the frame bit counter, the comparator capable of comparing a frame bit quota with the tally of the plurality of frame bit periods and producing a compare signal; and
  a set/reset logic block coupled to the comparator, the set/reset logic block capable of retaining a value of the compare signal and producing an unmasking signal.

2. The multiframe bus management device of claim 1, wherein the compare signal is produced by the comparator when the tally of the plurality of frame bit periods equals the frame bit quota.

3. The multiframe bus management device of claim 1, wherein the unmasking signal is produced by an assertive value of the compare signal.

4. The multiframe bus management device of claim 1, wherein the frame bit quota acts proportionally to the message length.

5. The multiframe bus management device of claim 1, wherein the set/reset logic block is coupled to a signal masking block capable of receiving the unmasking signal and propagating a masked signal.

6. The multiframe bus management device of claim 1, wherein the unmasking signal produces an interrupt, to a transmission managing application, signaling that a present message transmission is concluded.

7. The multiframe bus management device of claim 1, wherein the device is capable of processing a Local Interconnect Network (LIN) protocol.

8. A multiframe bus management device comprising:
  a frame bit counter capable of counting a plurality of frame bit periods and producing a tally of the plurality of frame bit periods counted during a message length;
  a finite state machine coupled to the frame bit counter and capable of extracting a frame bit quota from a message content;
  a comparator coupled to the frame bit counter and the finite state machine, the comparator configured to compare the frame bit quota with the tally and produce a compare signal; and
  a set/reset logic block coupled to the comparator and the finite state machine, the set/reset logic block capable of retaining a value of the compare signal and producing a unmasking signal.

9. The multiframe bus management device of claim 8, wherein the compare signal is produced by the comparator when the tally of the plurality of frame bit periods equals the frame bit quota.

10. The multiframe bus management device of claim 8, wherein the unmasking signal is produced by an assertive value of the compare signal.

11. The multiframe bus management device of claim 8, wherein the frame bit quota is proportional to the message length.

12. The multiframe bus management device of claim 8, wherein the set/reset logic block is coupled to a signal masking block capable of receiving the unmasking signal and propagating a masked signal.

13. The multiframe bus management device of claim 8, wherein the unmasking signal produces an interrupt, to a transmission managing application, signaling that a present message transmission is concluded.

14. The multiframe bus management device of claim 8, wherein the finite state machine resets the set/reset logic block, the frame bit counter, and the comparator at a conclusion of a message.

15. The multiframe bus management device of claim 8, wherein the device is capable of processing a Local Interconnect Network (LIN) protocol.

16. A multiframe bus management device comprising:
  a counting means for counting a plurality of frame bit periods and producing a tally of frame bit periods counted in a message;
  a controlling means for managing a bus transmission of the message and extracting a frame bit quota from the message;
  a comparing means, coupled to the counting means and the controlling means, for comparing the tally with the frame bit quota and producing a compare signal; and
  a set/reset means, coupled to the comparing means, for receiving the compare signal and generating a unmasking signal.

17. The multiframe bus management device of claim 16, further comprising a masking means for receiving the unmasking signal and unmasking a signal.

18. The multiframe bus management device of claim 16, wherein the device is capable of processing a Local Interconnect Network (LIN) protocol.

19. A process for managing a serial network interface comprising:
  receiving a frame bit quota proportional to a duration of a network message;

counting a plurality of frame bit periods in a message transmission;

comparing for an equality between a count of the plurality of frame bit periods and the frame bit quota; and unmasking a signal if the step of comparing produces an equality.

20. The process for managing a serial network interface of claim 19, further comprising interrupting a software application to signal a present message transmission is concluded.

21. A process for managing a serial network interface comprising:

receiving a specification of a duration of a message in a network transmission;

prescribing a frame bit quota equal to the message duration;

counting a plurality of frame bit periods in a message transmission;

producing a tally of the plurality of frame bit periods counted;

comparing the tally of the plurality of frame bit periods with the frame bit quota;

producing a compare signal if the tally of the plurality of frame bit periods is equal to the frame bit quota; and unmasking a signal if the compare signal is produced.

* * * * *